Dec. 15, 1964　　　C. A. DE GIERS　　　3,161,055
LIQUID LEVEL RESPONSIVE GAUGE SYSTEM
Filed Sept. 19, 1961　　　　　　　　　　3 Sheets-Sheet 1
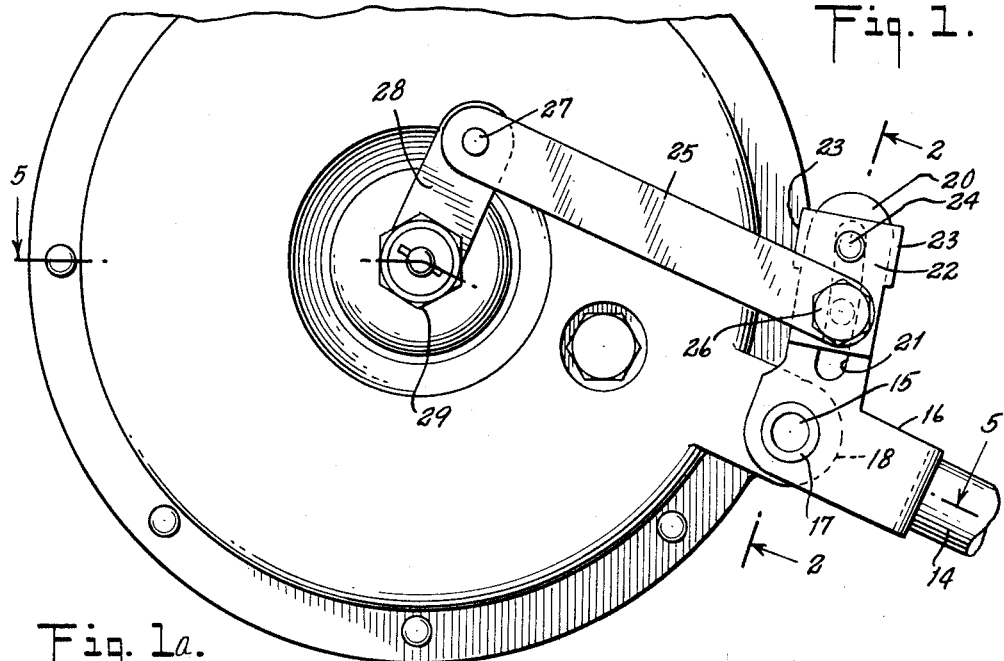
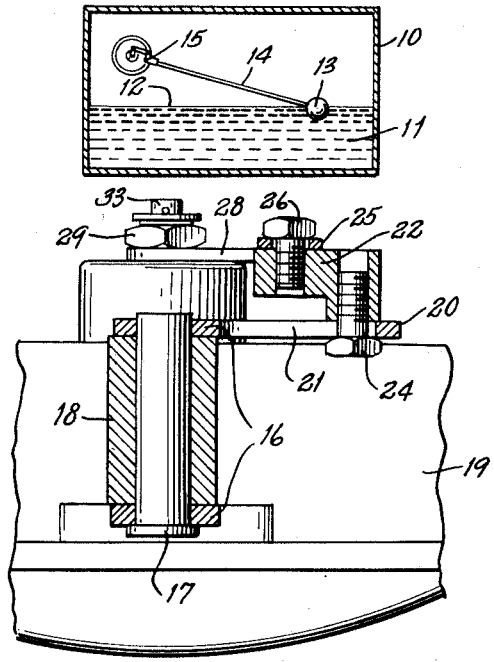
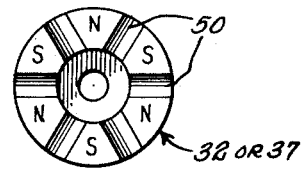
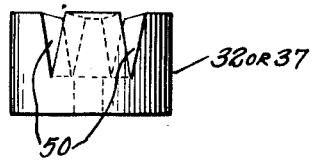
INVENTOR.
CLARENCE A. DE GIERS
BY
*Paul M. Phillips*
ATTORNEY Dec. 15, 1964  C. A. DE GIERS  3,161,055
LIQUID LEVEL RESPONSIVE GAUGE SYSTEM
Filed Sept. 19, 1961  3 Sheets-Sheet 2
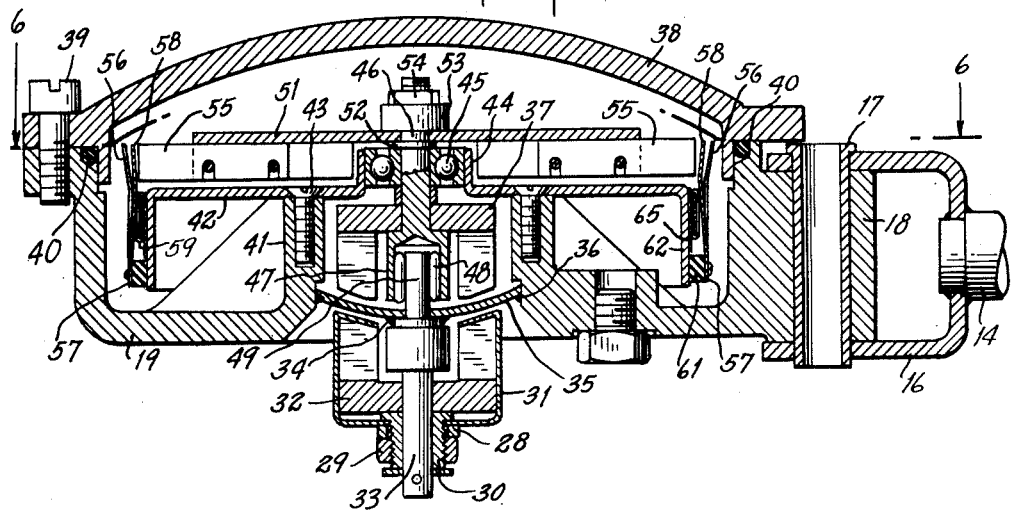
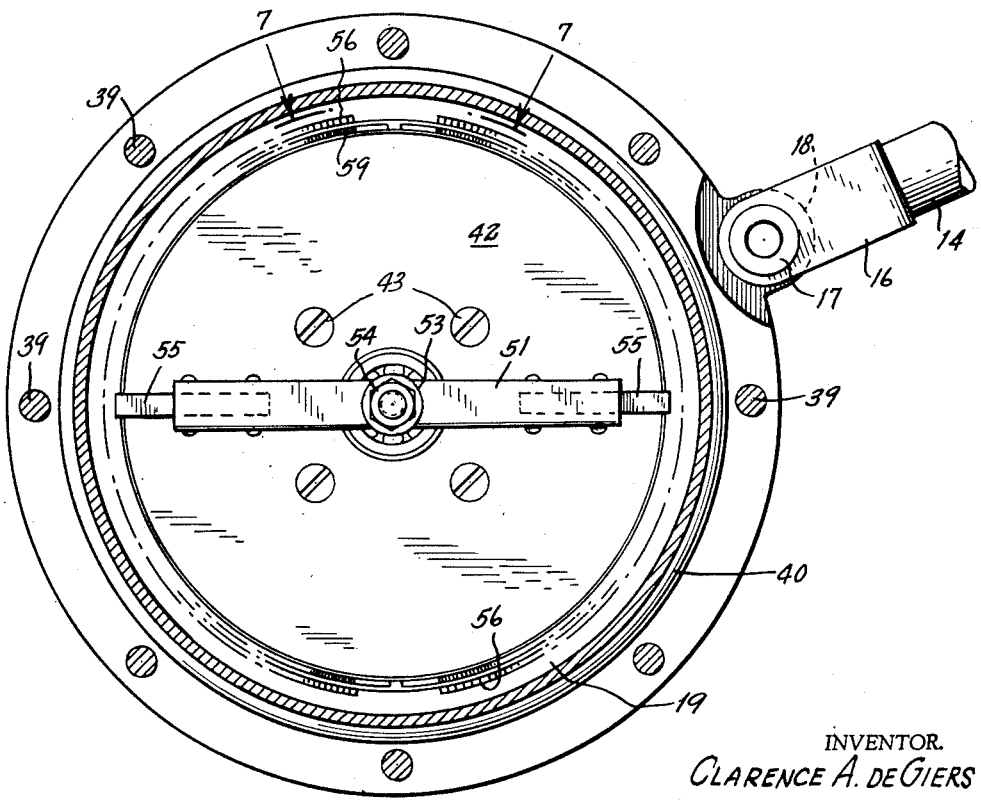
INVENTOR.
CLARENCE A. DE GIERS
BY
Paul M. Phillips
ATTORNEY

INVENTOR.
CLARENCE A. DE GIERS
BY
ATTORNEY

United States Patent Office 3,161,055
Patented Dec. 15, 1964

3,161,055
LIQUID LEVEL RESPONSIVE GAUGE SYSTEM
Clarence A. de Giers, Brookville, N.Y., assignor to The Liquidometer Corporation, Long Island City, N.Y., a corporation of Delaware
Filed Sept. 19, 1961, Ser. No. 139,206
6 Claims. (Cl. 73—313)

The present invention relates to a liquid level responsive gauge system and particularly to such a system or apparatus adapted for use under particular conditions where conventional known systems of this kind which are useful and fully operative under other and less strenuous circumstances are inadequate.

One such situation or set of conditions is in gauging the amount of liquid in a tank located on shipboard, where the rocking of the vessel, even sometimes while at anchor, results in such continuous changes in the levels of the liquid sensed by the system that the use of a variable resistor or potentiometer in the system, the setting of which is varied by changes in the liquid level, is such as to cause rapid wearing of the parts and particularly of the resistance coil of the resistor or potentiometer coil, resulting in the wires of this coil being cut through in a relatively short time. In order to avoid difficulties of this kind, the present invention provides arrangements wherein there is no abrasive wear of any kind on the variable resistance coil, but contact is made with respect thereto by relatively light reeds which are moved by flexure into contact with the coil by magnetic actuating means and which spring away from the coil by their own resiliency to a normal non-contacting position.

It is recognized that this principle is not broadly new at this time as a certain embodiment of it was included in my earlier Patent No. 2,484,690, granted October 11, 1949. In that patent, however, the operation was by a vertically sliding float which was not always satisfactory due to its frictional engagement with parts with respect to which it was slidably mounted; and further it was found that in some installations where the liquid to be gauged was not wholly clean, as in the ballast tanks of submarines, the dirt and other foreign matter, and sometimes corrosion of the metal of which the parts were made, tended to prevent free action.

The provision of a system which is capable of substantially foolproof operation under the strenuous conditions of use in ballast tanks of a submarine, for example, is a primary object of the present invention. In such a system, the parts are exposed to the sea water which is contained in these tanks while the submarine is submerged. If the water admitted to these tanks were always clean, which is seldom the case, most of the difficulties which are met with in practice would not occur. However, it is necessary that the system be able to operate notwithstanding substantial amounts of foreign matter present in the liquid being gauged. Under these circumstances it is found that the now well known capacitance-type liquid content gauges, which operate by the use of a probe extending into the liquid and which are sensitive to variations in the capacitance between spaced electrodes are not at all satisfactory as the conductivity of the sea water itself plus the difficulties incident to substantial amounts of foreign matter therein give the gauge characteristics of response which are far from accurate and practically require frequent cleaning of the probes. Furthermore, it is never sure when such a gauge begins to vary from its initial accuracy, so that the actual contents of the tanks are generally wholly a matter of guess work with a device of this kind.

Another use which is very demanding of gauges is that of measuring the level of liquefied gases, where extremely high pressures may be met with and where it is desired to use a gauge which will be substantially independent of the pressure within the tank containing the liquid to be gauged. In such an installation, provision must be made for holding the tank closely sealed notwithstanding the path or paths through which data must be transferred from the inside to the outside of the tank. In accordance with the present invention, this data is carried through by conductors which may extend through suitable insulation in a gas and pressure-proof manner, the data itself being transmitted electrically from means inside the tank to an external gauge or indicator.

When gauging liquids under substantial pressures as aforesaid, it is desirable that the mechanism exposed to the pressure be completely and wholly sealed from portions of the apparatus which are at or near atmospheric pressure and that the walls effecting such seal be imperforate as far as is possible. For this reason the present invention embodies a magnetic transmission of data as to the angular movement of a member caused by different levels occupied by a float in some ways similar to the magnetic data transmission described in my prior patent, No. 2,562,529, granted July 31, 1951.

Other features of the invention include the provision of adjustment means whereby a predetermined variation in the throw of the tank float arm can be caused to give other and independently predetermined variations in the setting of a variable resistance or potentiometer controlled thereby, so as to adapt a given apparatus to use under substantially different conditions and for use in different installations. Thus it is possible in accordance with the present invention to provide a given amplitude of movement of the float arms in accordance with the shape and size of the tank in which it is installed and in accordance with the amount of movement desired for the float. At the same time, it is possible to give a maximum or any other desired adjustment of the rheostat or variable resistance or potentiometer controlled by the float arm and its float.

Other and more detailed objects and advantages of the present invention and variations in the apparatus used to carry it out will be explained in connection with the description of a preferred embodiment of the invention and certain variations thereof, which are illustrated in the accompanying drawings, in which:

FIG. 1 is a fragmentary view of a portion of a float arm and means actuated thereby and particularly adjusting means between the float arm and the means actuated thereby;

FIG. 1a is a diagrammatic view on a substantially smaller scale of the apparatus of FIG. 1 showing how it can be installed in a tank and showing a float carried by the float arm;

FIG. 2 is a view in transverse section substantially on the line 2—2 of FIG. 1, showing the amplitude adjustment between the float arm on the one hand and the means for controlling the variable resistance on the other;

FIG. 3 is a face view of one of the permanent magnets used in transmission of float arm movement through the sealed casing, which is particularly useful in conjunction with measurement of liquids under substantial pressures;

FIG. 4 is a side elevation of the permanent magnet of FIG. 3;

Figure 7:
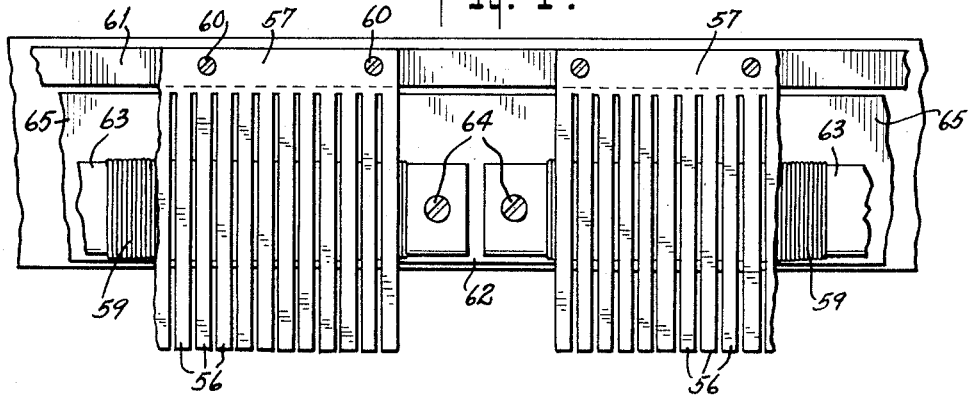
Figure 8:
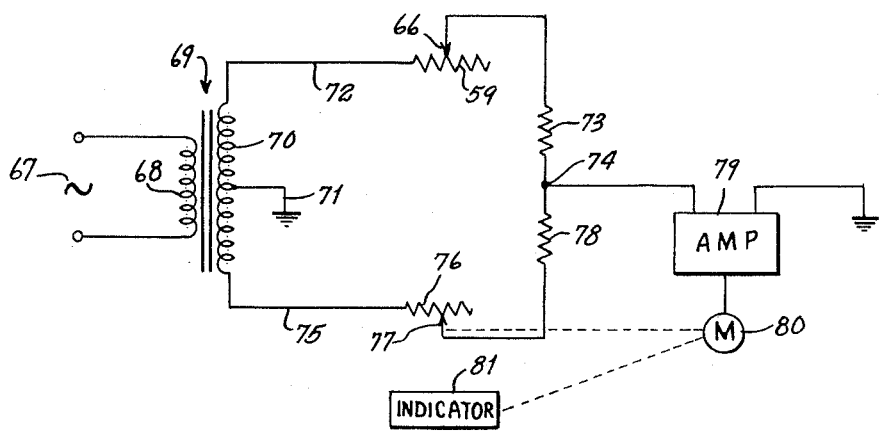
Figure 9:
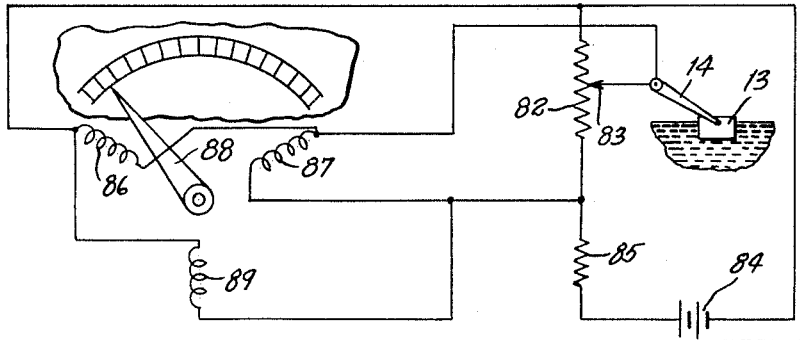

FIG. 5 is a sectional view taken on the broken line 5—5 of FIG. 1 showing a portion of the float arm, the means effecting the magnetic transmission through to the inside of the sealed resistor housing and also illustrating the mode of construction of the resistance coils, the reeds used in conjunction therewith and illustrating the action of the reeds under the influence of their actuating magnets;

FIG. 6 is a sectional view taken substantially on the line 6—6 of FIG. 5;

FIG. 7 is an enlarged fragmentary view on an enlarged scale showing the construction and mounting of the reeds and their relation to the resistance coil as seen on the line 7—7 of FIG. 6;

FIG. 8 is a circuit diagram of a null-type balanceable circuit for translating the float position of the device of FIGS. 1–7 into an indication on an indicator; and FIG. 9 shows another embodiment of a circuit means for converting float positions to indicator readings.

The system of the present invention can be operated by any suitable means which is responsive to the amount of liquid in a tank, one such means being a float which is supported by the liquid and floats on the surface thereof. It is also contemplated that a means responsive to liquid weight, such as a flexible diaphragm, could be suitably connected to actuate an arm for moving it about a pivot axis in a way more or less equivalent to the way a float moves such an arm. Thus, any suitable means capable of actuating an arm for moving it about an axis in response to the amount of liquid in a tank may be considered arm actuating means within the purview of the present invention. For purposes of illustration and not of limitation there is illustrated in FIG. 1a a tank 10 containing liquid 11, the level 12 of which is to be sensed and indicated and wherein there is a suitable float 13 supported upon the liquid at the level 12 thereof and appropriately connected to actuate a float arm 14 for moving it about a pivotal axis 15.

As particularly shown in FIGS. 1 and 2, the float arm 14 is rigidly secured to one arm of a bell crank lever 16, which is pivoted about a sleeve 17 constituting in effect the pivotal axis 15 aforesaid. In order that the lever 16 shall be mounted for minimum friction, irrespective of tendency of the float arm 14 to move in other than a single plane perpendicular to the axis 15, the bell crank lever 16 is formed in part as a yoke as shown in FIG. 5 and has two portions pivotally mounted on the opposite ends of the sleeve 17. The sleeve 17 is in turn carried by an extension 18 projecting from an annular housing 19 hereinafter to be described. Also forming a part of the bell crank lever 16 is a second arm 20, which is rigid and preferably integral therewith and which is provided with an arcuate slot 21, FIGS. 1 and 2. The arm 20 carries rigidly but adjustably secured thereto a sliding member 22 having lateral portions 23 embracing the sides of the arm 20. The member 22 is adjustably secured to the arm 20 by the headed bolt 24 which extends through the slot 21 and is threaded into an opening in the member 22 as shown best in FIG. 2. Pivotally secured to the member 22 is one end of a link 25 which is connected thereto as best seen in FIGS. 1 and 2 by means of a headed bolt 26 extending freely through a hole in the link 25 and threaded into the member 22. The device is constructed and arranged so that the link 25 may be rotated freely about the axis of the bolt 26. Thus by adjusting the position of the member 22 along the slot 21 and securing the adjustment by tightening the bolt 24, the position of the pivotal connection at the bolt 26 between the arm 20 and the member 22 on the one hand and the link 25 on the other, may be varied and the adjustment secured when it is set at the desired point.

The other end of the link 25 is pivotally connected at 27 to the outer end of a crank arm 28 which is suitably secured by a nut 29, the latter being threaded on the end of an annular stud 30 carrying a housing 31 and also carrying a permanent magnet 32 contained in said housing, the parts 28, 29, 30, 31 and 32 all being rigid with one another in normal used.

Thus it will be seen that movement of the float arm 14, occasioned in the present instance by variations in the level 12 of liquid in the tank 10 acting on the float 13, will be caused to actuate the bell crank 16, the link 25 and the crank arm 28 to rotate the permanent magnet 32. The stud 30 and parts connected thereto as aforesaid are arranged to be freely rotatable on a stationary pivot shaft 33, which is fixedly mounted as by welding as shown at 34, FIG. 5, to a relatively thin stationary wall portion 35 which in turn is welded as shown at 36 to a recess in the housing 19. The welding at 34 and 36 in each instance is completely around an annular course, so that in each instance the welding is such as to make the inside of the housing member 19 completely separate in a gas-proof and pressure-proof manner from that portion outside this housing where the float and the means hereinabove described are located. There are no movable means extending through this wall, i.e. through housing 19, the wall 35 or any parts adjacent thereto; and the shaft 33 which in fact extends through the wall 35 is rigidly welded thereto so as to prevent any possible leakage along this shaft.

While it is possible in accordance with the prior art and particularly in accordance with my prior Patent No. 2,562,529 aforesaid to transmit magnetic force through a wall using only a two-pole-type magnet on one side and using magnetic means, which are not per se permanent magnets, on the other side of the wall; it is preferred in accordance with the present invention to use a pair of complementary magnets each having a plurality of poles preferably greater than two and as particularly shown in FIGS. 3 and 4 in the present case having six such poles alternating south and north, the poles being directed in each instance in a direction axially of the substantially annular magnets. Thus, with an even total number of alternate south and north poles (three of each in the present instance), it is possible to arrange complementary similar magnets on the opposite sides of the wall 35, so as to have a south pole opposite a north pole and vice-versa, all around the axis of the two complementary magnets. One of these magnets is indicated generally in FIGS. 3 and 4 and is intended as identical with the magnet 32 previously described and also with the magnet 37, FIG. 5, shown inside the wall 35. This arrangement is preferred in order to minimize the number of different parts to be made when making a device of this kind.

The housing 19 is provided with a cover 38 which has a flange arranged to be secured to a flange of the housing by a plurality of bolts, one of which is shown at 39, FIG. 5, extending through holes in the peripheral flange of the cover 38 and threaded into a flange of the housing 19. The inside of the housing is made pressure-proof by suitable gasket means, which is indicated generally as an O-ring 40. From the point of view of the present invention, however, any suitable means may be provided to effect a gas and pressure-tight seal between the cover 38 and the housing 19.

Inside the housing 19 and preferably integral therewith is an inwardly extending annular wall portion 41 to which is secured an annular shell member 42 by suitable means such as machine screws 43. The shell member 42 has an inner axially extending flange 44 which carries the outer raceway of a ball bearing 45 serving as one bearing for a rotatable shaft 46 and parts carried thereby. The shaft 46 terminates at its lower end as seen in FIG. 5 in an integral counterbored enlargement 47 within which is a roller bearing 48 surrounding in inwardly extending stationary stud portion 49 of the shaft 33, which is axially aligned with the shaft 46. Thus the shaft 46 is provided at spaced portions axially therealong with suitable anti-friction bearings 45 and 48, ensuring that this shaft may be rotated with a minimum of friction and in a manner which will be accurate under all circumstances and substantially foolproof in use.

The shaft 46 has rigidly mounted thereon the magnet 37 referred to hereinabove. As seen in FIGS. 3 and 4, each of the permanent magnets 32 and 37 has each of its poles separated from adjacent poles around the periphery of the annulus by V-notches 50. Both these magnets 32 and 37 are permanent magnets and exert a maximum of electromagnetic force or flux in axial directions, so that movement of the magnet 32 by the means aforesaid results in accurately controlling the movement of the magnet 37 and parts carried thereby, even though the coupling therebetween is solely by electromagnetic force. In order that the flow of flux between the magnet poles shall be as uninterrupted as possible, it is preferred that the wall 35 be of some non-magnetic material, such as brass, which will be capable of withstanding the conditions of use both as to pressure and also as to chemical erosive action which may be present incident, for example, to the presence of sea water on one side thereof.

Also carried rigidly by the shaft 46 is a cross arm 51 (FIGS. 5 and 6), which is provided with an aperture through which extends a small diameter portion of the shaft 46, the cross arm 51 resting on a shoulder 52 thereof and is secured to the shaft in any suitable way, for example, by a spacer 53 and nut 54, the latter being threaded on an outer portion of the shaft 46.

The cross arm 51 as shown carries at each end thereof a permanent magnet 55, each of which is adapted to cooperate selectively with different ones of groups of reeds 56. Each series of reeds 56, as seen best in FIG. 7, constitutes a plurality of fingers or individual reeds extended from a common base portion 57, the individual reeds being of flexible metallic material which is a good conductor of electricity. The reeds are easily flexible within their elastic limits to move between normal positions shown in full lines in FIG. 5 which they occupy when out of the magnetic field of one of the magnets 55, and in section as shown at 58, FIG. 5, which is the position they assume when they are under the influence of the magnetizing force of one of the permanent magnets 55 and at which position they are in physical and electrical contact as shown in FIG. 5 with one or more turns respectively of a resistance coil 59, two of which are shown. As will be noted, the view in FIG. 7 is inverted with respect to the view in FIG. 5, and illustrates on an enlarged scale the construction and arrangement of the reeds with respect to the coils 59. The groups of reeds are held by screws 60 passing through the base portions 57 thereof and threaded into an annular strip 61 of insulating material which may be suitably fixedly mounted upon the lower end of a skirt portion 62 of the shell member 42, the reeds 56–57 being insulated from the shell member 42 and the housing 19 by means of the insulating strip 61. The resistance coils 59 are preferably wound in a conventional manner on insulating strips or annular portions thereof shown at 63 and suitably secured as by screws 64, FIG. 7, to portions of the skirt portion 62 of the shell 42. Suitable insulation as shown at 65, FIGS. 5 and 7, surrounds the skirt portions 62 of the shell 42 and separates it from the several turns of the resistance coil or coils 59.

As will be seen best in FIG. 5, the magnets 55 approach, but are never in actual physical engagement with any of the reeds 56 even at the positions 58 thereof, to which they are drawn by magnetic force when the magnets 55 are respectively opposite each of the reeds. Furthermore, there is substantially no rubbing movement or abrasive action of any kind between the reeds 56 on the one hand and the resistance coil or coils 59 on the other, as the reeds are merely drawn into physical contact with adjacent turns of the coil or coils respectively, but do not rub thereover as a slider on a rheostat or a potentiometer. As a result, there is substantially no physical wearing of the parts, even incident to an almost continuous oscillatory movement of the float and hence of the arm 51 as would occur in a ship which is rolling due to the normal ocean movements.

It has been found, for example, that when a float arrangement is connected directly or indirectly to operate a conventional slider on a resistance or a potentiometer coil, including that which is diagrammatically illustrated in my Patent No. 2,358,910, granted September 26, 1944, the abrasive wear incident to use on a ship subject to normal rocking when gauging a tank in the ship is such that the wires of the resistance coils are cut through sometimes in a very short period. Furthermore, the abrasive wear on the wire tends to vary the resistance of the coils incident solely to the wear, so as to vary the readings of the system in an undesired manner. The present arrangement avoids all these difficulties in that it eliminates rubbing or abrasive friction altogether.

While there is shown herein two separate coils 59 and two magnets 55 effective to cooperate with two different sets of reeds 56 based on two base or backing portions 57, it will be understood that the coils could be electrically connected in a single series or could be used in parallel or in any way in any circuit in which the device may be connected. Alternatively, the arm 51 could be supplied with only a single magnet 55 on one end and the other end suitably weighed so as to balance the arm as to its mechanical movement and one set of reeds with its associated resistance coil could be omitted completely.

Also, if desired, the two coils could be connected in different control circuits or systems, for example, one coil could be used in a control system for indicating the contents of the one tank in question, while the other coil could be used as a part of an indicating system for indicating the total contents of a number of tanks, appropriate connections being made for each.

There are a large number of different electrical systems which may be controlled by either a rheostat-connected or variable resistance or by a potentiometer-connected resistance. Two of these systems are shown in FIGS. 8 and 9.

Turning first to FIG. 8, one of the resistance coils 59 hereinabove described may be connected as shown at one end only; while the associated series of reeds 56 may be connected as indicated on the wiring diagram by the slider 66 shown as an arrow directed on to the coil 59. The circuit of this figure is a balanceable circuit of the null-balance type. It may be energized by a suitable source of alternating current indicated at 67 connected to the primary 68 of a transformer 69, the secondary 70 of which is center-tapped to ground as indicated at 71. One terminal of the secondary 70 is connected through a conductor 72 to one end of the resistance 59. The slider or variable tap 66, which in the present instance would be connected to the base 57 of one of the series of reeds may then be connected through a fixed resistor 73 to a circuit output terminal 74. The other terminal of the secondary 70 may then be connected through a conductor 75 to one terminal of a balancing resistor 76, the variable tap 77 of which is connected through a fixed resistor 78 to the output terminal 74. In one embodiment of the circuit at least, the resistors 73 and 78 may be the same and the resistance 76 may be approximately equal in its range to that of the resistance 59. Under these circumstances and with the center tap 71 to ground constituting one circuit output terminal and the circuit output terminal 74 the other, these output terminals may be connected to control a conventional phase-responsive amplifier 79, which in turn is connected to energize a circuit rebalancing motor 80 such as the usual servo motor. It will be understood that when there is a zero potential between ground at 71 and the output terminal 74, the motor 80 will not be actuated. When there is an output or potential between the circuit terminals 71 and 74, the motor will be actuated in a direction depending upon the direction of unbalance of the circuit which is represented by the phase of the output current. The motor 80 is thus actuated in one direction or the other, as long as there is a substantial electrical potential between the output terminals 71 and 74.

The motor 80 is mechanically connected as indicated by a broken line on the drawing to move the slider 77 on the resistance 76 in a direction such as to reduce the electrical output from the circuit substantially to zero. When this occurs and the circuit output is reduced substantially to zero, the motor 80 stops. The motor 80 is also mechanically connected as indicated by another broken line on the drawing to actuate an indicator 81, which is thus adjusted to indicate the adjusted position of the slider 77 on the resistor 76. When the circuit is balanced at zero electrical output and the motor 80 has stopped, the indicator 81 will thus indicate a value proportional to the setting of the slider 66 on the resistor 59 which, as hereinabove stated, is adjusted by the action of the liquid responsive means, i.e. the float working through the float arm, the coupling magnets to transmit the force to the inside of the housing and the one of the magnets 55 causing the appropriate reeds to make electrical contact with the coil 59.

Turning now to the circuit shown in FIG. 9, this is a somewhat simpler arrangement which is per se disclosed in my prior patent, No. 2,358,910, granted September 26, 1944 and including a ratiometer-type indicator controlled by a potentiometer-connected resistance here shown at 82. It will be understood that the resistance 82 could be either one of the resistance 59 in the example shown and described of the mechanical phases of the invention and that the setting of the potentiometer-resistance could be controlled by a float again given the same reference number 13 as in FIG. 1, acting through a float arm 14 and with the float suitably controlling the position of an electrical tap shown diagrammatically in FIG. 9 at 23 and cooperating with the resistance 82. Thus the electrical tap in accordance with the present invention would be constituted by the reed or reeds 56 which are opposite one of the magnets 55 and which are caused to move (as shown at 58, FIG. 5) into contact with the coil 59 corresponding to the resistance 82. The remainder of the circuit involves a source of E.M.F. 84, a fixed resistor 85, conductors as shown, and a ratiometer-type indicator including a pair of actuating coils 86 and 87 arranged with their axes at a substantial angle, as 120°, to one another and arranged jointly to affect and control the position of a transversely magnetized rotor carrying a pointer 88. There is also a third coil 89 which may be used as a loading coil or otherwise as taught in the prior art. The differential energization of the coils 86 and 87 will cause a resultant direction of magnetic flux affecting and controlling the position of pointer 88, all in proportion to the position of the variable tap 83 on the potentiometer-connecting resistance 82 which, as previously stated, is controlled in position by the position of the float 13.

Inasmuch as this circuit and the control thereof is all well known in the art at this time, no further details will be given thereof.

It will be understood that while the present construction, both mechanically and electrically, is illustrated and described in a brief form in accordance with the patent statutes, various changes may be made therein as has been suggested as the description has proceeded. Furthermore, other variations will be suggested to those skilled in the art from the foregoing particular description of a preferred embodiment of the invention. I do not wish to be limited, therefore, except by the scope of the appended claims, which are to be construed validly as broadly as the state of the art permits.

What is claimed is:

1. A liquid level-responsive indicating means, comprising a float mounted for limited movement in a predetermined path so as to be afloat on the surface of the liquid, the level of which is to be indicated and to follow variations in the level of the liquid throughout a predetermined range of such levels, permanent magnet means mechanically connected to said float so as to be rotated by movement thereof, a wall having bearing means fixed with respect thereto on one side thereof on which said permanent magnet means is mounted for rotation, a second bearing means fixed with respect to and located on the other side of said wall, complementary permanent magnet means mounted on said second bearing means and located so as to be in the magnetic field of the first-named permanent magnet means, so that rotative movement of said first-named magnet means caused by movements of said float will be transmitted solely by magnetic flux through said wall to rotate said complementary permanent magnet means; a variable resistance coil comprising spaced turns of resistive wire supported upon a circular member fixedly positioned in concentric relation to the axis of said second bearing means and having the outermost peripheral wire surface thereof bared of electrical insulation, a plurality of electrically connected planar reeds of electrically conductive flexible sheet material fixedly supported in cantilever manner at one end to extend approximately parallel to said axis and to lie substantially in a planar cylindrical surface concentric with said circular member but radially spaced from and axially overlapping said peripheral wire surface of said coil, rotatable means fixed with respect to said complementary permanent magnet means so as to be rotatable therewith, a third permanent magnet carried by said rotatable means and movable thereby in a circular path adjacent the free ends of said plurality of parallel reeds so that as said third permanent magnet approaches each of said reeds the latter will be moved radially thereby to a position approaching but out of contact with said third permanent magnet but into contact with at least one bared turn of said coil; a source of electric energy, an indicator located at a distance from said liquid and said float, and electric circuit means including at least a part of said coil and said reeds for causing said indicator to indicate a value proportional to the liquid level controlled by at least one of said reeds coming into contact with a bared turn of said coil.

2. Apparatus for indicating the level of liquid in a closed tank independent of the fluid pressure therein, comprising a sealed housing having at least one wall exposed to the inside of said tank, bearing means extending on both sides of said exposed wall, first and second similar permanent magnet means each having a plurality of north and a plurality of south poles arranged alternately in an annular series, means mounting each said magnet means for free rotation on said bearing means on opposite sides of said wall respectively and with their poles directed toward each other, a float mechanically connected to rotate said first permanent magnet means which is inside said tank and outside said housing; an annular resistance coil arranged inside said housing concentric with said bearing means and having the outermost peripheral turns surface thereof bared of electrical insulation for electrically conductive engagement therewith, an annular series of individually movable reeds of conductive and magnetic material all of which are anchored at one end within said housing concentric with said bearing means at radii larger than said peripheral surface of said coil and which are movable by flexure within their elastic limit into contact with said coil, said reeds normally being out of contact therewith, a cross arm rigidly secured to said second permanent magnet means which is inside said housing and carrying a third permanent magnet which is movable with said second permanent magnet means in a path adjacent to but always out of contact with said reeds, and said third permanent magnet being effective when adjacent to each reed respectively to cause it to flex so as to contact said coil; an indicator, and an electric telemetering system including said resistance coil and connected to be controlled by the variable resistance of at least one part of said coil as determined by what reed is in contact therewith and mechanically and electrically connected to operate said indicator for indicating the level of liquid in said tank.

3. Apparatus in accordance with claim 2, in which the connection between said float and said first permanent magnet means comprises a float arm carrying said float and mounted for movement about a substantially horizontal axis, a crank arm rigid with said float arm, a second crank arm rigid with said first permanent magnet means, and a link connecting said crank arms.

4. Apparatus in accordance with claim 3, in which the connection between said link and one of said crank arms is adjustable radially of said one crank arm, so as to vary the range of settings of said resistance coil for a given movement of said float.

5. A position indicating device comprising a shaft supported for rotation about a longitudinal axis to an angular position varying with the magnitude of a condition to be indicated, an annular resistor element fixedly positioned concentric with said axis and having an outermost peripheral surface enabling along the length thereof electrically conductive engagement by a conductive member, a plurality of electrically-connected planar reeds of electrically conductive yet flexible sheet material having magnetizable portions at one end and being fixedly supported in cantilever manner at their other end to extend approximately parallel to said axis and to lie substantially in a cylindrical surface concentric with said axis but radially spaced from and overlapping said peripheral surface of said resistor, and a permanent magnet supported on said shaft for rotation therewith and having a magnetic pole face movable in a circular path adjacent to but non-engageably spaced from said magnetizable ends of said reeds magnetically to attract each immediately adjacent reed into flexed conductive engagement with said conductive surface of said resistor, whereby the value of resistance between an end terminal of said resistor and said reeds is indicative of the magnitude of said condition to be indicated.

6. A position indicating device comprising a shaft supported for rotation about a longitudinal axis to an angular position varying with the magnitude of a condition to be indicated, an annular resistor fixedly positioned concentric with and normal to said axis and having an outermost peripheral surface enabling along the length thereof electrically conductive engagement by a conductive member, an electrically conductive cylindrical member of magnetic flexible sheet material fixedly positioned concentrically to enclose said resistor in uniformly spaced relation thereto and having axially extending edge serrations forming flexible reeds positioned in opposing relation to said resistor and with free ends extending axially beyond said resistor, and a permanent magnet supported on said shaft for rotation therewith and having a magnetic pole face movable in a circular path adjacent to but non-engageably spaced from said free ends of said reeds magnetically to attract each adjacent reed into flexed electrical engagement with said outermost peripheral surface of said resistor, whereby the value of resistance between an end terminal of said resistor and said conductive cylindrical member is indicative of the magnitude of said condition to be indicated.

References Cited in the file of this patent

UNITED STATES PATENTS

| | | |
|---|---|---|
| 1,604,010 | Zielinski | Oct. 19, 1926 |
| 1,607,512 | Churcher | Nov. 16, 1926 |
| 1,997,002 | Ledoux | Apr. 9, 1935 |
| 2,484,690 | De Giers | Oct. 11, 1949 |

FOREIGN PATENTS

| | | |
|---|---|---|
| 162,505 | Australia | Apr. 18, 1955 |
| 406,642 | Italy | Dec. 5, 1943 |